United States Patent
Baranwal et al.

(10) Patent No.: US 12,118,376 B2
(45) Date of Patent: Oct. 15, 2024

(54) VIRTUAL MODE EXECUTION MANAGER

(71) Applicants: STMicroelectronics International N.V., Geneva (CH); STMicroelectronics Application GmbH, Aschheim-Dornach (DE)

(72) Inventors: Deepak Baranwal, Greater Noida (IN); Amritanshu Anand, Noida (IN); Roberto Colombo, Munich (DE); Boris Vittorelli, Pfaffing (DE)

(73) Assignees: STMicroelectronics International N.V., Geneva (CH); STMicroeletronics Application GmbH, Aschheim-Dornach (DE)

( * ) Notice: Subject to any disclaimer, the term of this patent is extended or adjusted under 35 U.S.C. 154(b) by 641 days.

(21) Appl. No.: 17/235,206

(22) Filed: Apr. 20, 2021

(65) Prior Publication Data
US 2022/0334862 A1      Oct. 20, 2022

(51) Int. Cl.
G06F 9/455    (2018.01)
G06F 9/48     (2006.01)
G06F 9/50     (2006.01)

(52) U.S. Cl.
CPC .......... *G06F 9/45558* (2013.01); *G06F 9/455* (2013.01); *G06F 9/45533* (2013.01);
(Continued)

(58) Field of Classification Search
CPC ... G06F 2009/4557; G06F 2009/45575; G06F 2009/45579; G06F 9/48; G06F 9/4812;
(Continued)

(56) References Cited

U.S. PATENT DOCUMENTS 8,356,120 B2    1/2013   Tsirkin et al.
8,745,619 B2    6/2014   Fujisaki et al.
(Continued)

FOREIGN PATENT DOCUMENTS

CN    106897106 A    6/2017
CN    108255576 A    7/2018
(Continued)

OTHER PUBLICATIONS

EP Search Report and Written Opinion for counterpart EP Appl. 22163572.5, report dated Sep. 14, 2022, 10 pgs.
(Continued)

*Primary Examiner* — Charles M Swift
(74) *Attorney, Agent, or Firm* — Crowe & Dunlevy LLC

(57) ABSTRACT

Disclosed herein is hardware for easing the process of changing the execution mode of a virtual machine and its associated resources. By adopting the hardware, it is possible to trigger a change in the execution mode in an automatic way, without software intervention, and without interfering with the execution of other virtual machines. In addition, in case an error has occurred for a virtual machine and it is detected, the hardware can be used to disable the resources associated with that virtual machine and generate notification of the completion this operation to other hardware, which will complete the reset of the virtual machine. By adopting the hardware, the execution mode change is simplified and offers configurability and flexibility for a system running multiple virtual machines.

22 Claims, 1 Drawing Sheet

(52) U.S. Cl.
CPC .............. *G06F 9/48* (2013.01); *G06F 9/4812* (2013.01); *G06F 9/4843* (2013.01); *G06F 9/485* (2013.01); *G06F 9/4856* (2013.01); *G06F 9/4881* (2013.01); *G06F 9/50* (2013.01); *G06F 9/5083* (2013.01); *G06F 9/5088* (2013.01); *G06F 2009/4557* (2013.01); *G06F 2009/45575* (2013.01)

(58) Field of Classification Search
CPC ...... G06F 9/4843; G06F 9/485; G06F 9/4856; G06F 9/4881; G06F 9/50; G06F 9/5083; G06F 9/5088; G06F 9/455; G06F 9/45533; G06F 9/45558
See application file for complete search history.

(56) References Cited

U.S. PATENT DOCUMENTS

| | | | |
|---|---|---|---|
| 8,856,788 | B2 | 10/2014 | Tsirkin et al. |
| 8,924,965 | B2 | 12/2014 | Tsirkin et al. |
| 9,003,080 | B2 | 4/2015 | Bachrany et al. |
| 9,183,029 | B2 | 11/2015 | Tsirkin |
| 9,501,137 | B2 | 11/2016 | Kruglick |
| 9,563,457 | B2 | 2/2017 | Lukacs et al. |
| 9,703,590 | B2 | 7/2017 | Kamino et al. |
| 9,864,626 | B2 | 1/2018 | Levchenko et al. |
| 10,095,862 | B2 | 10/2018 | Dore et al. |
| 10,558,446 | B2 | 2/2020 | Wright |
| 10,628,203 | B1 | 4/2020 | Ovchinnikov et al. |
| 10,831,522 | B1 | 11/2020 | Ozerkov et al. |
| 2008/0086729 | A1 | 4/2008 | Kondoh et al. |
| 2009/0119087 | A1* | 5/2009 | Ang ................... G06F 9/45558 703/23 |
| 2010/0250824 | A1* | 9/2010 | Belay .................. G06F 9/45558 718/1 |
| 2012/0084487 | A1* | 4/2012 | Barde ................. G06F 9/45541 718/1 |
| 2013/0155045 | A1* | 6/2013 | Khodorkovsky ..... G06F 1/3206 345/212 |
| 2014/0359613 | A1* | 12/2014 | Tsirkin ................. G06F 9/5088 718/1 |
| 2016/0162316 | A1* | 6/2016 | King ....................... G06F 13/28 718/1 |
| 2017/0103003 | A1 | 4/2017 | Jin |
| 2019/0163511 | A1 | 5/2019 | Sakalanaga et al. |
| 2020/0057664 | A1 | 2/2020 | Durham et al. |

FOREIGN PATENT DOCUMENTS

| | | |
|---|---|---|
| CN | 109508226 A | 3/2019 |
| CN | 109981493 A | 7/2019 |
| CN | 110347474 A | 10/2019 |
| CN | 111090491 A | 5/2020 |
| CN | 111651239 A | 9/2020 |
| GB | 2516944 A | 2/2015 |
| KR | 1020140140719 A | 12/2014 |
| WO | 2017209955 A1 | 12/2017 |
| WO | 2019094843 A1 | 5/2019 |

OTHER PUBLICATIONS

Anonymous: "Clock gating—Wikipedia", Mar. 31, 2021 (Mar. 31, 2021), pp. 1-7, XP055958025.

Haoran Li et al.—"Multi-Mode Virtualization for Soft Real-Time Systems", 2018 IEEE Real-Time and Embedded Technology and Applications Symposium (RTAS), IEEE, Apr. 11, 2018 (Apr. 11, 2018), pp. 117-128, XP033382533.

Advanced Micro Devices, Inc., AMD I/O Virtualization Technology (IOMMU) Specification License Agreement, Advanced MicroDevices, PID 48882, Rev. 2.00—Mar. 24, 2011, 167 pages.

"Solution Design Guide for Cisco Unified Contact Center Enterprise, Release 11.6," Americas Headquarters, Cisco Systems, Inc., First Published: Aug. 24, 2017; Last Modified: Mar. 22, 2019 (488 pages).

Dunlap, George W., et al: "ReVirt: Enabling Intrusion Analysis through Virtual-Machine Logging and Replay," Proceedings of the 2002 Symposium on Operating Systems Design and Implementation (OSDI), 14 pages.

Liebergeld, Stefen, et al.: "Towards Modular Security-conscious Virtual Machines," https://users.kernkonzept.com/-steffen/website/papers/rtlws2010_modularvms.pdf, 2010, 12 pages.

* cited by examiner

VIRTUAL MODE EXECUTION MANAGER

TECHNICAL FIELD

This disclosure is related to the field of virtual machines in a computing environment and, in particular, to hardware based techniques for performing mode changes of virtual machines without performing a global reset or global pause of resources and/or peripherals.

BACKGROUND

New generations of microcontrollers, such as those intended for use in the automotive field, are increasingly complex. This increase in complexity is due, for example, to an increasing number of desired functionalities (new protocols, new features, etc.) and due to the tight constraints of execution conditions (e.g., lower power consumption, increased calculation power and speed, tight boot time, etc.). In parallel to the growth in complexity, flexibility in the microcontroller configuration is desired in order to provide single microcontroller solutions for use in products that previously required multiple microcontrollers. As a result of this, virtualization functionality is increasingly becoming part of the microcontrollers developed for the automotive market.

Virtualization involves different applications running on the same microcontroller, with a defined separation of the resources used by each application, with the aim being to avoid one virtual application (often called a "virtual machine") accessing the resources allocated to another virtual application.

Virtualization can be either physical or logical. Physical virtualization exists when multiple central processing units (CPUs), or a CPU with multiple cores, are contained within one microcontroller, and those CPUs are statically assigned to different virtual machines. In this case, each virtual machine is associated with a specific CPU or core, and its application software is limited to running on that specific CPU or core. Thus, a physical virtualization implies that each virtual machine runs in parallel, because each virtual machine uses a separate CPU or core.

Logical virtualization exists when the set of CPUs (or set of cores within a CPU) is not statically divided and assigned to different virtual machines, but instead multiple virtual machines are assigned to a single CPU or core. A logical virtualization implies that each virtual machine runs in a time-sharing mode, because a software layer (referred to as a hypervisor) activates and de-activates each virtual machine, one at a time, according to a pre-defined policy.

It will further be noted that a mixed physical and logical virtualization situation can also exist, for example, with multiple CPUs or cores implementing physical virtualization and other CPUs or cores implementing logical virtualization.

The CPUs or cores involved in virtualization implements three execution modes, namely: User, Privilege (also called operating system or OS mode), and Hypervisor.

The privilege mode is assigned to the operating system, which divides application run-time into tasks (or processes), each of which executes a specific defined functionality within a preset time.

A job of the operating system is to activate one task at a time and perform that task until the next task is activated, which can happen either after a certain time has elapsed, or because an asynchronous event, like an interrupt, has occurred.

The operating system is executed at the Privilege level, whereas a task (or process) is executed at the User level. The execution level is assigned by the CPU or core when the operating system or a task is running, and knowledge of such execution level may be available to the hardware as sideband signal.

This makes it possible to regulate the access to the system resources with dedicated logic hardware (which may be referred to as a Memory Protection Unit (MPU)). In fact, the MPU can be programmed to implement access rules for various system resources. For example, when a resource is desired to be accessed, the MPU compares the execution level used by the CPU or core for performing the task with the execution level at which the target resource is requested. Based on the comparison, access to that resource is allowed or blocked. This way it is possible to limit the access to some resources to the Privilege execution level. In addition to the execution level, the operating system may assign a task (or process) identification (ID) value to each different task. This information, if available also as signals distributed within the device, can be also used by system resource protection hardware or software to further regulate the access to the system resources.

Virtualization works in a similar manner: a dedicated software layer, called a hypervisor, activates the execution of the various virtual machines according to specific policies (e.g., time-sharing, etc.). The hypervisor runs at the hypervisor level, and the level at which tasks are executed may be set by the CPU or core. Therefore, the MPU can regulate the access to the various system resources according to three possible levels: hypervisor, privilege (also called OS), and user level.

In addition, similarly to what is done by the operating system for the tasks as described above, the hypervisor assigns a unique identifier to each virtual machine. This information is usually also available as hardware (HW) sideband signals distributed within the microcontroller, and hence can be used by the MPU to allow access to certain system resources for one specific virtual machine, and block the access for the other virtual machines.

Therefore, to summarize the above, by using the memory protection unit, system resources, like peripheral devices (for example, other hardware devices within the same system-on-a-chip as the CPU) and related functionalities, can be individually allocated to a certain virtual machine by configuring the virtual machine identification (ID) that can access that resource.

In addition, a peripheral might be configured so that it does not belong to a specific virtual machine and access thereto is possible solely at the hypervisor level.

Keeping this background on virtual machines in mind, it may be desired to change the execution mode of a virtual machine, and such a change of execution mode may be particularly complex because certain resources may be shared among different virtual machines. Still further, some mode changes involve a reset of the system, such as is the case with certain ARM-based cores, and in those cases, it is desired to complete outstanding transactions generated by the CPU or core before the CPU or core can be reset, otherwise the system might enter a deadlock state. In addition, the reset of a virtual machine may be desired due to a device or software malfunction which blocks the virtual machine execution.

Hence, the reset of the virtual machine, whose software is stuck, cannot be performed by the virtual machine itself, but is rather performed by another virtual machine or by the hypervisor software itself. As can therefore be appreciated, the whole mechanism, when performed solely in software, can be rather difficult and time consuming.

Reset of a malfunctioning virtual machine may be split into following phases:
1. A virtual machine dedicated to handle device malfunctions is notified by a system fault collector that a malfunction occurred with a given a virtual machine;
2. The malfunctioning virtual machine does not answer requests, and is considered as blocked and to be reset;
3. The peripherals and resources allocated to a malfunctioning virtual machine are to complete outstanding transactions or tasks; and
4. Thereafter, a reset is applied to the CPU or core assigned the malfunctioning virtual machine.

Existing techniques dedicated to handling the mode change are performed at the Hypervisor level, complete with the requisite completion of outstanding transactions or tasks by all peripherals or resources prior to mode change. This brings about a variety of less than desirable effects. As such, further development into mode change for virtual machines is needed.

SUMMARY

Disclosed herein is a microcontroller, including a microprocessor executing a plurality of virtual machines, and a plurality of peripherals, with different ones of the plurality of virtual machines using different subsets of the plurality of peripherals during execution in different modes. The microcontroller includes mode change logic circuitry configured to: receive a mode change request from the microprocessor, the mode change request indicating which of the plurality of virtual machines are to change execution mode and what execution modes those virtual machines are to change to; and send the mode change request to the virtual execution mode manager circuitry.

The microcontroller further includes virtual execution mode manager circuitry configured to, for each virtual machine having its execution mode changed, send clock gate requests to the subset of the plurality of peripherals corresponding to the execution mode that virtual machine is to change to.

The subset the plurality of peripherals, in response to the clock gate requests, are configured to complete their current operations, enter into a clock-gated state, and send clock-gate acknowledgement signals to the virtual execution mode manager. The virtual execution mode manager circuitry is further configured to, for each virtual machine having its execution mode changed, send a mode change acknowledgement to the mode entry logic circuitry indicating that the execution mode of that virtual machine is ready to be changed, wherein the mode change logic circuitry is further configured to, for each virtual machine having its execution mode changed, change that virtual machine to the execution mode it is to change to, and send a mode change completion indication to the virtual execution mode manager circuitry. The virtual execution mode manager is further configured to, for each virtual machine whose execution mode has changed, generate an interrupt and send that interrupt to the microprocessor. The microprocessor may contain multiple cores, and which core receives the interrupt is configurable; the core receiving the interrupt may be the core executing the associated virtual machine having its execution mode changed, or may be a different core in some cases.

The microcontroller may include a set of registers within the virtual execution mode manager for each virtual machine storing indications of which subset of the plurality of peripherals are used in what execution modes, and the virtual execution mode manager may be configured to, for each virtual machine having its execution mode changed, read the registers corresponding to the execution mode that virtual machine is to be changed into so as to know which subset of the plurality of peripherals to send the clock gate request to.

A set of registers may be within the mode change logic circuitry for each virtual machine storing indications of which subset of the plurality of peripherals are used in what execution modes, and the mode change logic circuitry may be configured to, for each virtual machine having its execution mode changed, read the registers corresponding to the execution mode that virtual machine is to be changed into and send data from those registers to the virtual execution mode manager so that the virtual execution mode manager knows which subset of the plurality of peripherals to send the clock gate request to.

The mode entry logic circuitry may be configured to, during changing virtual machines to the execution modes they are to be changed to, re-start the subsets of peripherals corresponding to those execution modes such that they switch back from the clock-gated state to an operational state.

The plurality of virtual machines may be executed on a single core of the microprocessor.

The virtual execution mode manager circuitry may be further configured to, for each virtual machine having its execution mode changed, send clock gate requests to a subset of the plurality of peripherals corresponding to the execution mode that virtual machine is currently in, at the same time as sending clock gate requests to the subset of the plurality of peripherals corresponding to the execution mode that the virtual machine is to switch to. In addition, the subsets the plurality of peripherals, in response to the sent clock gate requests, may be configured to complete their current operations, enter into a clock-gated state, and send clock-gate acknowledgement signals to the virtual execution mode manager.

A method aspect is also disclosed herein. The method includes: executing a first virtual machine in a first execution mode, the first virtual machine in the first execution mode using a first subset of a plurality of peripherals; executing a second virtual machine in a second execution mode, the second virtual machine in the second execution mode using a second subset of the plurality of peripherals; sending an indication to mode entry logic circuitry that the first virtual machine is to be changed to execute in a third execution mode, the third execution mode using a third subset of the plurality of peripherals; sending a mode change request from the mode entry logic circuitry to a virtual execution mode manager indicating that the first virtual machine is to change mode to the third execution mode; sending clock gate requests from the virtual execution mode manager to the third subset of the plurality of peripherals; in response to the third subset of the plurality of peripherals completing current tasks, placing the third subset into a clock-gated mode, and sending clock-gate acknowledgements back to the virtual execution mode manager; sending a mode change acknowledgement from the virtual execution mode manager to the mode entry logic circuitry indicating that the first virtual machine is ready to be changed to the third execution mode; changing the first virtual machine to the third execution mode; sending a mode change completed indication from the mode entry logic circuitry to the virtual execution mode manager to indicate that mode change is complete; and generating an interrupt in response to receipt of the mode change completed indication. The first and second virtual machines may be executed on different cores of a same microprocessor. In some instances, the core executing the first virtual machine may receive the interrupt, but in other instances, the core executing the second virtual machine may receive the interrupt instead. Which core receives the interrupt may be configurable.

The method may further include sending clock gate requests from the virtual execution manager to the first subset of the plurality of peripherals at a same time as sending the clock gate requests to the third subset of the plurality of peripherals, and in response to the first subset of the plurality of peripherals completing current tasks, placing the first subset into a clock-gated mode, and sending clock-gate acknowledgements back to the virtual execution manager, prior to sending the mode change acknowledgement.

The method may also include storing indications of which subset of the plurality of peripherals are to be used in what execution modes in a set of registers within the virtual execution mode manager, and for each virtual machine to have its execution mode changed, reading the registers corresponding to the execution mode that virtual machine is to be changed into so as to know which subset of the plurality of peripherals to send the clock gate request to.

The method may also include storing indications of which subset of the plurality of peripherals are to be used in what execution modes in a set of registers within the mode entry logic circuitry, and, for each virtual machine to have its execution mode changed, reading the registers corresponding to the execution mode that virtual machine is to be changed into and send data from those registers to the virtual execution mode manager so that the virtual execution mode manager knows which subset of the plurality of peripherals to send the clock gate request to.

The method may also include, during changing virtual machines to the execution modes they are to be changed to, re-starting the subsets of peripherals corresponding to those execution modes such that they switch back from the clock-gated state to an operational state.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Disclosed herein is hardware, such as may be implemented into a system-on-a-chip or other microcontroller, which enables the change of execution modes of individual virtual machines separately without affecting peripherals or resources not used by those virtual machines having their execution mode changed. This is performed by allowing the identification of which peripherals or resources are used in what execution modes for different virtual machines. This in turn also allows for a partial system reset instead of a global reset when a virtual machine is to be reset, and also allows for the disabling of some peripherals and resources when not needed so as to save power.

Figure 1:
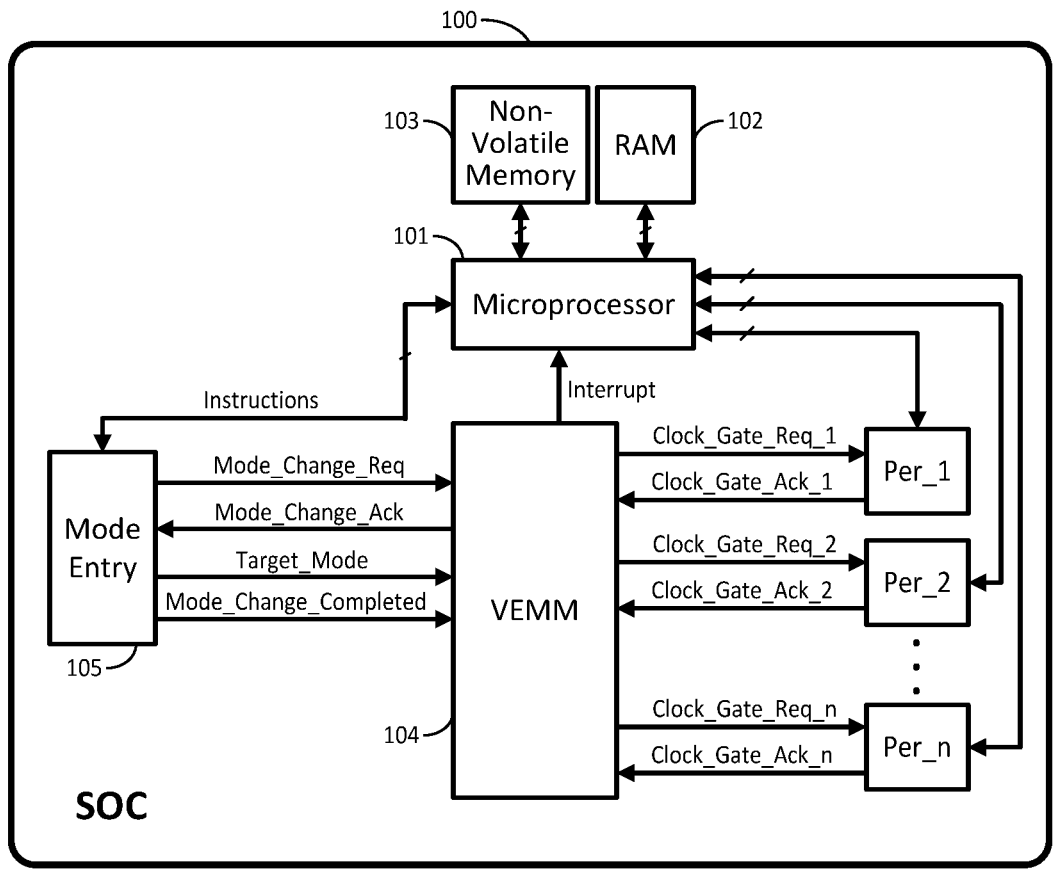
FIG. 1 is a block diagram of a system-on-a-chip incorporating the virtual execution mode manager and mode entry hardware blocks described herein that enable the switching of execution modes of virtual machines, as described herein.

Details of the hardware and techniques for operation are now given. Referring initially to FIG. 1, a system-on-a-chip (SOC) 100 is described. The SOC 100 includes a microprocessor 101, such as a multi-core ARM based microprocessor. The microprocessor 101 executes multiple virtual machines as well as a hypervisor for managing resources used by those virtual machines. For example, each core of the microprocessor 101 may execute multiple virtual machines.

The SOC 100 includes a volatile memory (e.g., random access memory) 102 and a non-volatile memory (e.g., flash RAM) 103 in bidirectional communication with the microprocessor 101. The SOC 100 further includes multiple peripherals, Per_1, Per_2, . . . , Per_n, with "n" being of any integer number. These peripherals Per_1, Per_2, . . . , Per_n may be any suitable devices incorporated within the SOC. A mode entry logic circuit 105 (e.g., hardware executing a state machine) is coupled to the microprocessor 101 to receive mode change instructions (for changing execution modes of one or more virtual machines executed by the microprocessor 101) from the microprocessor, and a virtual execution mode manager (VEMM) 104 (e.g., hardware executing a state machine) is coupled to the microprocessor 101 to generate interrupts to the microprocessor. The mode entry logic circuit 105 and VEMM 104 are in bidirectional communication with each other, as are the VEMM 104 and the peripherals Per_1, Per_2, . . . , Per_n.

Figure 2:
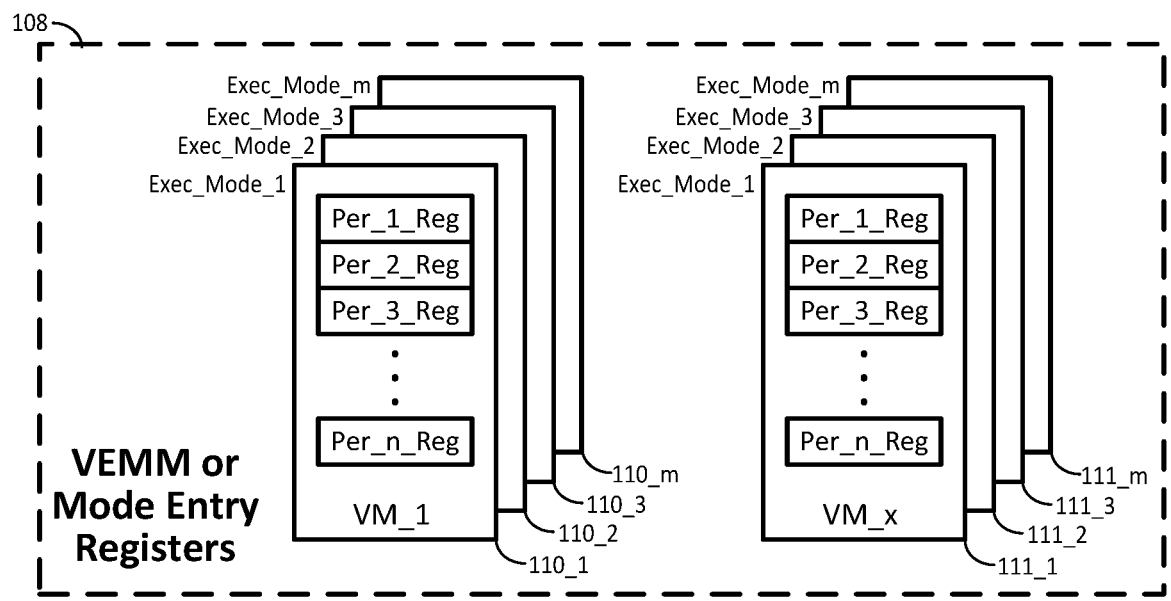
FIG. 2 is a block diagram of registers contained within the virtual execution mode manager or mode entry hardware blocks, used to store data about which peripherals are to be enabled for what execution modes, as described herein.

Shown in FIG. 2 are sets of registers 110_1, 110_2, 110_3, . . . , 110_m and 111_1, 111_2, 111_3, . . . , 111_m organized into groups, with each group being for an individual virtual machine (e.g., VM_1, VM_x) executed by the microprocessor 101. These registers may be contained within the mode entry logic circuitry 105 or within the VEMM 104. Stored in the registers are definitions for the state of each peripheral available to each virtual machine for each virtual machine execution mode. For example, the register 110_1 may indicate that when the virtual machine VM_1 is in a first execution mode Exec_Mode_1, one set of peripherals or resources is to be activated and available, and the register 110_2 may indicate that when the virtual machine VM_1 is in a second execution mode Exec_Mode_2, a different set of peripherals or resources is to be activated and available. Likewise, the register 111_1 may indicate that when the virtual machine VM_x is in a first execution mode Exec_Mode_1, one set of peripherals or resources is to be activated and available, and the register 111_2 may indicate that when the virtual machine VM_x is in a second execution mode Exec_Mode_2, a different set of peripherals or resources is to be activated and available.

Given the above, a mode switching operation enabled by the mode entry logic circuitry 105 and VEMM 104 is now described.

Initially, the virtual machines (executed on one or more cores of the microprocessor 101) are each in a starting mode, keeping in mind that the starting mode may be different for each virtual machine. Then, the microprocessor 101 (for example, a hypervisor running in the microprocessor 101) sends mode change instructions to the mode entry logic circuitry 105 requesting that at least one of the virtual machines change from its starting mode to another mode.

The mode change instructions include an identification of which virtual machine or virtual machines are to change mode, and an identification of the particular mode to which those virtual machines are to change, and may be stored within a separate register within the mode entry logic circuitry 105.

The mode entry logic circuitry 105 then sends a mode change request or requests Mode_Change_Req and the target mode or modes Target_Mode to the VEMM 104, specifying which virtual machine or virtual machines are to change mode, and what mode those virtual machines are to change into, all of which may be stored in separate registers within the VEMM 104.

In the event that the registers 110_1, 110_2, 110_3, . . . , 110_m and 111_1, 111_2, 111_3, . . . , 111_m are part of the mode entry logic circuitry 105, the mode entry logic circuitry 105 also sends to the VEMM 104 the contents of the relevant registers from among the registers 100_1, 110_2, 110_3, . . . , 110_m and 111_1, 111_2, 111_3, . . . , 111_m to indicate, for each virtual machine to have its mode change, which peripherals Per_1, Per_2, . . . , Per_n or resources are to be currently in use by that virtual machine and which peripherals or resources are to be used by that virtual machine in the execution mode the virtual machine is to change into. In the event that the registers 110_1, 110_2, 110_3, . . . , 110_m and 111_1, 111_2, 111_3, . . . , 111_m are part of the VEMM 104, then the VEMM 104 can utilize the contents of the relevant registers.

In order to change the mode of a virtual machine, the peripherals Per_1, Per_2, . . . , Per_n or resources currently being used by that virtual machine are to first be stopped, either by placing them into a reset state or a frozen (clock-gated) state. From the point of view of the virtual machine, the main difference between the reset state and the frozen state is that when the peripheral or resource is clock-gated, it is stopped but does not lose its configuration, whereas when it is reset, it loses its configuration. Therefore, here, the clock-gated state will be used.

Therefore, upon receiving the mode change request or requests Mode_Change_Req and the target mode or modes Target_Mode, for each virtual machine to have its mode changed, the VEMM 104 sends a clock-gate request to the peripherals Per_1, Per_2, . . . , Per_n or resources currently being used by that virtual machine in the current mode as well as to the peripherals Per_1, Per_2, . . . , Per_n or resources to be used by that virtual machine in the mode into which it is to change. If, for example, the peripheral Per_1 is currently being used by the virtual machine to have its mode change, and the peripheral Per_2 is to be used by the virtual machine in the mode into which it is going to change, the VEMM 104 sends clock gate request signals Clock_Gate_Req_1 and Clock_Gate_Req_2 to peripheral Per_1 and peripheral Per_2. Upon receipt of the clock gate request signals Clock_Gate_Req_1 and Clock_Gate_Req_2, the peripherals Per_1 and Per_2 complete their currently outstanding operations (e.g., operations or instructions they have begun to perform but have not completed performing), place themselves into the clock-gated state, and send acknowledgements Clock_Gate_Ack_1 and Clock_Gate_Ack_2 back to the VEMM 104 to indicate they are now in the clock-gated state.

Upon receiving the acknowledgements from each peripheral or resource to be placed into the clock-gated state, for each virtual machine to have its state changed, the VEMM 104 sends a mode change acknowledgement signal Mode_Change_Ack to the mode entry logic circuitry 105 indicating that that virtual machine is ready to have its mode changed, and the mode entry logic circuitry 105 in turn effectuates the change in mode for each such virtual machine. As will be explained in detail below, the VEMM 104 generates and sends an interrupt once the mode change is complete. Note that the mode change for each virtual machine may involve re-starting (not resetting) the clock gated resources or peripherals to be used by that virtual machine in the new execution mode into a normal operating state, which is not performed for resources or peripherals that were not stopped and were allowed to continue their operation.

After the mode change is completed, the virtual machine selected for that mode change is notified for the completion of the execution mode change by the mode entry logic circuitry 105 sending the mode change completed signal Mode_Change_Completed to the VEMM 104, and then VEMM 104 in turn asserting an interrupt. This interrupt can be sent to the core or cores of the microprocessor 101 assigned to that virtual machine, or can be sent to another virtual machine, or to the hypervisor.

As stated, in some instances, the microprocessor core receiving the interrupt may not be the microprocessor executing the virtual machine that underwent mode change. For instance, the mode change may have been initiated because the virtual machine that underwent mode change had locked up or been malfunctioning, and therefore another microprocessor core, running a hypervisor, was instructed to reset the locked up or malfunctioning virtual machine. As such, the mode change completed signal Mode_Change_Completed from the mode entry logic circuitry 105 may indicate which virtual machine (or the hypervisor) is to receive the interrupt.

Note that the above hardware and techniques are able to be incorporated within any system-on-a-chip or within any microcontroller, and not just those for use in automotive applications.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:
1. A microcontroller, comprising:
a microprocessor executing a plurality of virtual machines;
virtual execution mode manager circuitry comprising a hardware device coupled to the microprocessor and configured to execute a state machine that generates interrupts to the microprocessor;
a plurality of peripherals, with different ones of the plurality of virtual machines using different subsets of the plurality of peripherals during execution in different modes, the plurality of peripherals being hardware devices in bidirectional communication with the hardware device of the virtual execution mode manager circuitry;
mode change logic circuitry configured to:
receive a mode change request from the microprocessor, the mode change request indicating which of the plurality of virtual machines are to change execution mode and what execution modes those virtual machines are to change to; and
send the mode change request to the virtual execution mode manager circuitry; and the virtual execution mode manager circuitry further configured to, for each virtual machine having its execution mode changed, send clock gate requests to the subset of the plurality of peripherals corresponding to the execution mode that virtual machine is to change to;

wherein the subset the plurality of peripherals, in response to the clock gate requests, are configured to complete their current operations, enter into a clock-gated state, and send clock-gate acknowledgement signals to the virtual execution mode manager circuitry;

wherein the virtual execution mode manager circuitry is further configured to, for each virtual machine having its execution mode changed, send a mode change acknowledgement to mode entry logic circuitry indicating that the execution mode of that virtual machine is ready to be changed;

wherein the mode change logic circuitry is further configured to, for each virtual machine having its execution mode changed, change that virtual machine to the execution mode it is to change to, and send a mode change completion indication to the virtual execution mode manager circuitry; and wherein the virtual execution mode manager circuitry is further configured to, for each virtual machine whose execution mode has changed, generate an interrupt and send that interrupt to the microprocessor.

2. The microcontroller of claim 1, further comprising a set of registers within the virtual execution mode manager circuitry for each virtual machine storing indications of which subset of the plurality of peripherals are used in what execution modes; and wherein the virtual execution mode manager circuitry is configured to, for each virtual machine having its execution mode changed, read the registers corresponding to the execution mode that virtual machine is to be changed into so as to know which subset of the plurality of peripherals to send the clock gate request to.

3. The microcontroller of claim 1, further comprising a set of registers within the mode change logic circuitry for each virtual machine storing indications of which subset of the plurality of peripherals are used in what execution modes; wherein the mode change logic circuitry is configured to, for each virtual machine having its execution mode changed, read the registers corresponding to the execution mode that virtual machine is to be changed into and send data from those registers to the virtual execution mode manager circuitry so that the virtual execution mode manager circuitry knows which subset of the plurality of peripherals to send the clock gate request to.

4. The microcontroller of claim 1, wherein the mode entry logic circuitry is configured to, during changing virtual machines to the execution modes they are to be changed to, re-start the subsets of peripherals corresponding to those execution modes such that they switch back from the clock-gated state to an operational state.

5. The microcontroller of claim 1, wherein at least some of the plurality of virtual machines are executed on a single core of the microprocessor.

6. The microcontroller of claim 1, wherein the virtual execution mode manager circuitry is further configured to, for each virtual machine having its execution mode changed, send clock gate requests to a subset of the plurality of peripherals corresponding to the execution mode that virtual machine is currently in, at the same time as sending clock gate requests to the subset of the plurality of peripherals corresponding to the execution mode that the virtual machine is to switch to; and wherein the subsets the plurality of peripherals, in response to the sent clock gate requests, are configured to complete their current operations, enter into a clock-gated state, and send clock-gate acknowledgement signals to the virtual execution mode manager circuitry.

7. The microcontroller of claim 1, wherein the microprocessor includes a plurality of cores, with different cores executing different ones of the plurality of virtual machines; and wherein the virtual execution mode manager circuitry, for at least one virtual machine whose execution mode has been changed, sends the generated interrupt to the core executing that virtual machine.

8. The microcontroller of claim 1, wherein the microprocessor includes a plurality of cores, with different cores executing different ones of the plurality of virtual machines; and wherein the virtual execution mode manager circuitry, for at least one virtual machine whose execution mode has been changed, sends the generated interrupt to a core not executing that virtual machine.

9. A method, comprising:
executing a first virtual machine in a first execution mode on a microprocessor, the first virtual machine in the first execution mode using a first subset of a plurality of peripherals that are hardware devices;
executing a second virtual machine in a second execution mode on the microprocessor, the second virtual machine in the second execution mode using a second subset of the plurality of peripherals;
sending an indication to mode entry logic circuitry that the first virtual machine is to be changed to execute in a third execution mode, the third execution mode using a third subset of the plurality of peripherals;
sending a mode change request from the mode entry logic circuitry to virtual execution mode manager circuitry embodied within a hardware device coupled to the microprocessor to execute a state machine generating interrupts to the microprocessor, and in bidirectional communication with the plurality of peripherals, the mode change request indicating that the first virtual machine is to change mode to the third execution mode;
sending clock gate requests from the virtual execution mode manager circuitry to the third subset of the plurality of peripherals;
in response to the third subset of the plurality of peripherals completing current tasks, placing the third subset into a clock-gated mode, and sending clock-gate acknowledgements back to the virtual execution mode manager circuitry;
sending a mode change acknowledgement from the virtual execution mode manager circuitry to the mode entry logic circuitry indicating that the first virtual machine is ready to be changed to the third execution mode;
changing the first virtual machine to the third execution mode;
sending a mode change completed indication from the mode entry logic circuitry to the virtual execution mode manager circuitry to indicate that mode change is complete; and
generating an interrupt in response to receipt of the mode change completed indication.

10. The method of claim 9, further comprising:
sending clock gate requests from the virtual execution mode manager circuitry to the first subset of the plurality of peripherals at a same time as sending the clock gate requests to the third subset of the plurality of peripherals; and in response to the first subset of the plurality of peripherals completing current tasks, placing the first subset into a clock-gated mode, and sending clock-gate acknowledgements back to the virtual execution mode manager circuitry, prior to sending the mode change acknowledgement.

11. The method of claim 9, further comprising storing indications of which subset of the plurality of peripherals are to be used in what execution modes in a set of registers within the virtual execution mode manager circuitry, and for each virtual machine to have its execution mode changed, reading the registers corresponding to the execution mode that virtual machine is to be changed into so as to know which subset of the plurality of peripherals to send the clock gate request to.

12. The method of claim 9, further comprising storing indications of which subset of the plurality of peripherals are to be used in what execution modes in a set of registers within the mode entry logic circuitry, and, for each virtual machine to have its execution mode changed, reading the registers corresponding to the execution mode that virtual machine is to be changed into and send data from those registers to the virtual execution mode manager circuitry so that the virtual execution mode manager circuitry knows which subset of the plurality of peripherals to send the clock gate request to.

13. The method of claim 9, further comprising, during changing virtual machines to the execution modes they are to be changed to, re-starting the subsets of peripherals corresponding to those execution modes such that they switch back from the clock-gated state to an operational state.

14. The method of claim 9, wherein the first and second virtual machines are executed on different cores of a same microprocessor and the core executing the first virtual machine receives the interrupt.

15. The method of claim 9, wherein the first and second virtual machines are executed on different cores of a same microprocessor and the core executing the second virtual machine receives the interrupt.

16. A microcontroller, comprising:
a microprocessor executing a plurality of virtual machines;
virtual execution mode manager circuitry comprising a hardware device coupled to the microprocessor and configured to execute a state machine that generates interrupts to the microprocessor;
a plurality of peripherals, with different ones of the plurality of virtual machines using different subsets of the plurality of peripherals during execution in different modes modes, the plurality of peripherals being hardware devices in bidirectional communication with the hardware device of the virtual execution mode manager circuitry;
mode change logic circuitry configured to:
receive a mode change request from the microprocessor, the mode change request indicating which of the plurality of virtual machines are to change execution mode; and
send the mode change request to the virtual execution mode manager circuitry; and
the virtual execution mode manager circuitry configured to, for each virtual machine having its execution mode changed, send clock gate requests to the subset of the plurality of peripherals corresponding to that virtual machine;
wherein the subset the plurality of peripherals, in response to the clock gate requests, are configured to complete their current operations, enter into a clock-gated state, and send clock-gate acknowledgement signals to the virtual execution mode manager circuitry;
wherein the virtual execution mode manager circuitry is further configured to, for each virtual machine having its execution mode changed, send a mode change acknowledgement to the mode entry logic circuitry indicating that the execution mode of that virtual machine is ready to be changed;
wherein the mode change logic circuitry is further configured to, for each virtual machine having its execution mode changed, change the execution mode of that virtual machine, and send a mode change completion indication to the virtual execution mode manager circuitry; and
wherein the virtual execution mode manager circuitry is further configured to, for each virtual machine whose execution mode has changed, generate an interrupt.

17. The microcontroller of claim 16, further comprising a set of registers within the virtual execution mode manager circuitry for each virtual machine storing indications of which subset of the plurality of peripherals are used in what execution modes; and wherein the virtual execution mode manager circuitry is configured to, for each virtual machine having its execution mode changed, read the corresponding registers.

18. The microcontroller of claim 16, wherein the mode entry logic circuitry is configured to, during changing execution modes of the virtual machines, re-starting the subsets of peripherals corresponding to those virtual machines such that they switch back from the clock-gated state to an operational state.

19. The microcontroller of claim 16, wherein at least some of the plurality of virtual machines are executed on a single core of the microprocessor.

20. The microcontroller of claim 16, wherein the virtual execution mode manager circuitry is further configured to, for each virtual machine having its execution mode changed, send clock gate requests to a subset of the plurality of peripherals corresponding to an execution mode that virtual machine is currently in, at the same time as sending clock gate requests to the subset of the plurality of peripherals corresponding to an execution mode that the virtual machine is to switch to; and wherein the subsets the plurality of peripherals, in response to the sent clock gate requests, are configured to complete their current operations, enter into a clock-gated state, and send clock-gate acknowledgement signals to the virtual execution mode manager circuitry.

21. The microcontroller of claim 16, wherein the microprocessor includes a plurality of cores, with different cores executing different ones of the plurality of virtual machines; and wherein the virtual execution mode manager circuitry, for at least one virtual machine whose execution mode has been changed, sends the generated interrupt to the core executing that virtual machine.

22. The microcontroller of claim 16, wherein the microprocessor includes a plurality of cores, with different cores executing different ones of the plurality of virtual machines; and wherein the virtual execution mode manager circuitry, for at least one virtual machine whose execution mode has been changed, sends the generated interrupt to a core not executing that virtual machine.

* * * * *